S. CELINSKI.
DEVICE FOR HOLDING PLATE GLASS IN AUTOMOBILE CURTAINS.
APPLICATION FILED JAN. 20, 1920.
1,360,094.  Patented Nov. 23, 1920.
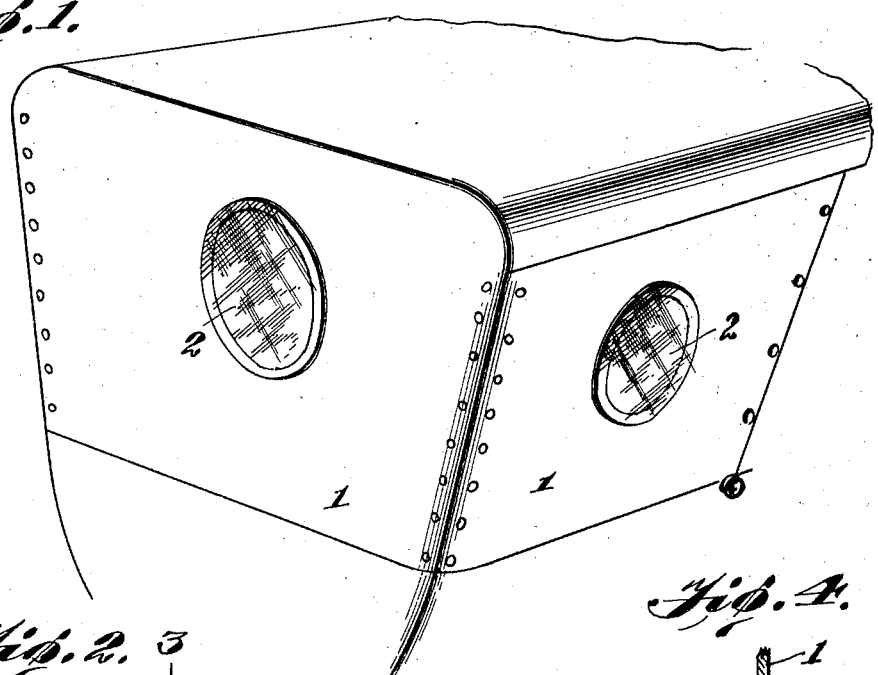
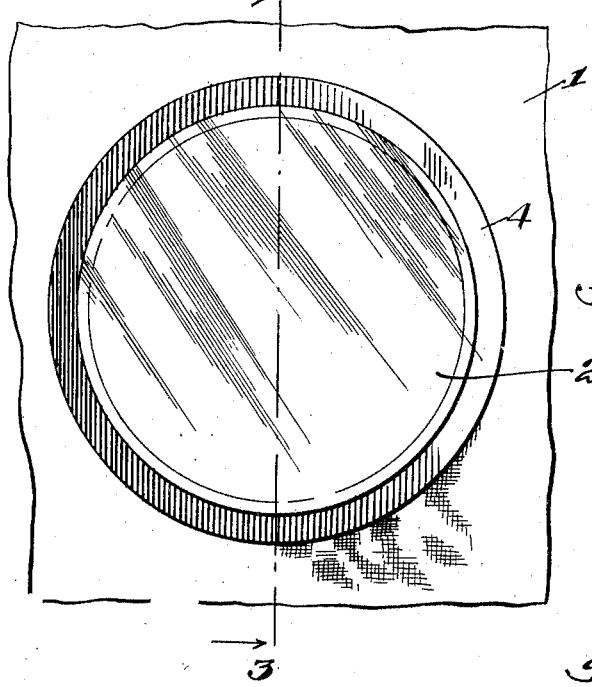
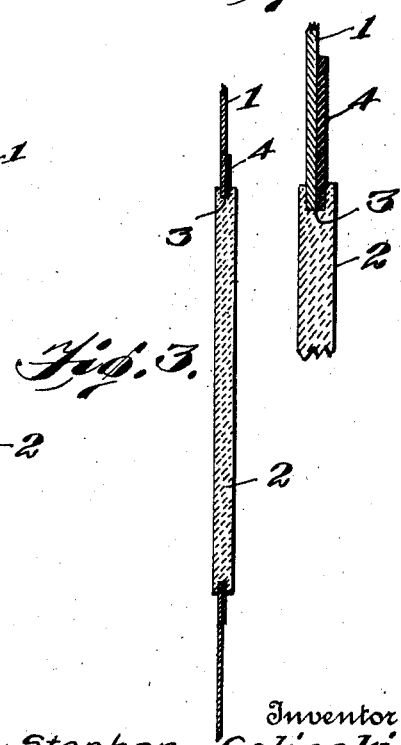
Inventor
Stephen Celinski.
By E. E. Vrooman & Co.,
his Attorneys

UNITED STATES PATENT OFFICE.

STEPHEN CELINSKI, OF BUFFALO, NEW YORK.

DEVICE FOR HOLDING PLATE-GLASS IN AUTOMOBILE-CURTAINS.

1,360,094.

Specification of Letters Patent.

Patented Nov. 23, 1920.

Application filed January 20, 1920. Serial No. 352,744.

*To all whom it may concern:*

Be it known that I, STEPHEN CELINSKI, a citizen of the United States, residing at Buffalo, in the county of Erie and State of New York, have invented certain new and useful Improvements in Devices for Holding Plate-Glass in Automobile-Curtains, of which the following is a specification, reference being had therein to the accompanying drawings.

This invention relates to a device for holding plate glass in automobile curtains whether it is the rear or side curtains of the top or cover for a motor vehicle.

The object of the invention is the provision of simple and efficient means for holding glass in a curtain or flexible body, which body is formed from cloth or fabric.

With this and other objects in view, my invention comprises certain novel constructions and arrangements of parts as will be hereinafter specifically described, illustrated in the accompanying drawings and more particularly pointed out in the appended claims.

In the drawings:

Figure 1 is a fragmentary perspective view of the top or cover of a motor vehicle or carriage showing my device applied thereto.

Fig. 2 is a view in elevation of my improved device.

Fig. 3 is a section taken on line 3—3, Fig. 2, looking in the direction of the arrows.

Fig. 4 is an enlarged fragmentary sectional view of the device.

Referring to the drawings by numerals:

1 designates the curtain, whether it be the side or rear curtain of a motor vehicle or any other type of a vehicle. The curtain comprises a piece or strip of fabric, and in this piece of fabric 1 is formed a large opening or aperture in which is placed the glass 2. The glass 2 is provided with a groove 3 into which extends the fabric 1, and around the edge, and lying flat against the inner face of the fabric, is suitably fastened a rubber strip or "band" 4; this strip 4 acts as a filler for the groove 3 and also as a stiffener, making it hard for the glass 2 to be accidentally or quickly moved out of the opening formed in the fabric 1, as I have found from practical experience. However, upon the operator exerting great stress, it is possible to remove the glass 2 from the fabric or curtain 1, and it will be appreciated that if the glass 2 is broken, the pieces can be quickly removed from within the opening in the fabric and a new glass 2 inserted in the fabric or curtain.

This produces a very simple and efficient attaching means for retaining the glass upon the curtain.

My invention eliminates any metallic fastening means such as bands or metal strips attached to the fabric 1 but the same advantage is obtained by my simple structure, as when using cumbersome or costly metallic fastening means, since the plate glass is securely and efficiently fastened in the fabric or curtain with the groove and band structures as shown and described.

It is to be understood that in manufacturing my device on a large scale, certain minor changes or alterations may be made by one skilled in the art to which this invention relates and, therefore, I reserve the right to make such changes or alterations as shall appear to one skilled in the art to which this invention relates and which shall clearly fall within the scope of the appended claims.

What I claim is:

1. In a device of the class described, the combination with a piece of fabric provided with an aperture, of a glass provided in its edge with a contiguous groove, said fabric having the portion thereof at the edge of the aperture extending into the groove of the glass, and a flat reinforcing rubber elastic band lying against one side of the fabric and extending into the groove, acting as a filling means and also as a stiffener of the fabric for normally preventing the removal of the glass from out of the aperture of the fabric.

2. In a device of the class described, the combination with the curtain of an automobile, provided with a glass-receiving aperture, a flat reinforcing and stiffening band lying against the inner face of the curtain and contiguous to the edge of the aperture, a glass provided with a continuous groove in its edge, said fabric and band at the aperture positioned in the groove and filling the same, said band extending a considerable distance out of the groove and stiffening the fabric for normally holding the glass in position upon the curtain, but owing to its elasticity, permitting the glass to be removed when desired and a new glass inserted without additional material being added or any removal of the band or any portion of the fabric, substantially as shown and described.

In testimony whereof I hereunto affix my signature.

STEPHEN CELINSKI.